(12) United States Patent
Jones

(10) Patent No.: US 7,872,073 B2
(45) Date of Patent: Jan. 18, 2011

(54) DISPERSION SPINNING CORE-SHELL FLUOROPOLYMERS

(75) Inventor: Clay Woodward Jones, Fort Collins, CO (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 552 days.

(21) Appl. No.: 12/019,804

(22) Filed: Jan. 25, 2008

(65) Prior Publication Data

US 2008/0119608 A1   May 22, 2008

Related U.S. Application Data

(62) Division of application No. 10/980,701, filed on Nov. 3, 2004, now Pat. No. 7,347,960.

(60) Provisional application No. 60/533,497, filed on Dec. 31, 2003.

(51) Int. Cl.
    *C08L 6/12*   (2006.01)

(52) U.S. Cl. ............... 525/54.3; 428/421; 523/201; 524/500; 264/127; 525/55

(58) Field of Classification Search ........... 264/127; 428/421; 523/201; 524/500; 525/54.3, 55
    See application file for complete search history.

(56) References Cited

U.S. PATENT DOCUMENTS

| | | | |
|---|---|---|---|
| 2,772,444 A * | 12/1956 | Burrows et al. ............... 264/127 |
| 3,037,953 A | 6/1962 | Marks et al. | |
| 3,114,672 A | 12/1963 | Schott | |
| 3,655,853 A * | 4/1972 | Gallup ........................ 264/127 |
| 3,819,594 A | 6/1974 | Holmes et al. | |
| 4,629,654 A * | 12/1986 | Sasaki et al. ................. 428/373 |
| 4,837,267 A | 6/1989 | Malhotra | |
| 5,324,785 A | 6/1994 | Noda et al. | |
| 5,762,846 A * | 6/1998 | Blankenbeckler et al. ... 264/127 |
| 5,820,984 A | 10/1998 | Blankenbeckler et al. | |
| 6,841,594 B2 | 1/2005 | Jones | |
| 7,347,960 B2 * | 3/2008 | Jones ......................... 264/127 |
| 2003/0008944 A1 | 1/2003 | Jones et al. | |
| 2003/0130393 A1 | 7/2003 | Cavanaugh | |
| 2005/0222313 A1 * | 10/2005 | Tomihashi et al. ............ 524/366 |
| 2005/0228072 A1 * | 10/2005 | Winkler et al. ............... 523/171 |
| 2007/0029697 A1 * | 2/2007 | Flowers et al. ............. 264/178 F |

FOREIGN PATENT DOCUMENTS

| JP | 60-231815 | * 11/1985 |
|---|---|---|
| WO | WO-2005/066402 A1 * | 7/2005 |

OTHER PUBLICATIONS

C. A. Sperati & H. W. Starkweather, Jr.; Fluorine-Containing Polymers. II. Polytetrafluoroethylene; Fortschr. Hochpolym.-Forsch., Bd. 2, S. 465-495 (1961).

* cited by examiner

*Primary Examiner*—Peter D. Mulcahy
*Assistant Examiner*—Henry Hu

(57) ABSTRACT

A process is disclosed for dispersion spinning non-melt-processible fluoropolymer fiber in which a mixture of an aqueous dispersion of non-melt-processible fluoropolymer particles and an aqueous solution of a matrix polymer is formed. The non-melt-processible fluoropolymer particles have an SSG of less than about 2.40 and comprise a core of high molecular weight polytetrafluoroethylene and a shell of lower molecular weight polytetrafluoroethylene or modified polytetrafluoroethylene. The mixture is extruded into a coagulation bath containing a concentration of ions which coagulate the matrix polymer to form an intermediate fiber structure. The intermediate fiber structure is sintered to decompose the matrix polymer and coalesce the non-melt-processible fluoropolymer particles to form the fiber. The present invention also provides a spinning composition useful for the dispersion spinning of non-melt-processible fluoropolymer fiber.

12 Claims, No Drawings

DISPERSION SPINNING CORE-SHELL FLUOROPOLYMERS

FIELD OF THE INVENTION

This invention relates to a process for dispersion spinning non-melt-processible fluoropolymers to form fibers.

BACKGROUND OF THE INVENTION

Polytetrafluoroethylene (PTFE) homopolymers and related modified PTFE polymers have exceptional stability to light, heat, solvents, chemical attack and electrical stresses, conferring desirable properties to articles made from these polymers. But because of the inability to melt process these polymers and the difficulties associated with solution processing, it is very difficult to spin or shape them by conventional methods. Therefore other processes have been developed for preparing fibers of PTFE homopolymers and modified PTFE.

Dispersion spinning is one method developed for producing shaped articles such as fibers from fluorinated polymers. Non-melt processible fluoropolymers may be successfully spun from a mixture of an aqueous dispersion of fluorinated polymer particles mixed with a solution of a suitable matrix polymer. An intermediate structure is formed when this mixture is contacted with a suitable coagulation bath. Although the intermediate structure is mechanically sound, a final, sintered structure is generally formed by heating the intermediate structure to a temperature sufficient to coalesce the fluorinated polymer particles. On sintering the matrix polymer decomposes to form volatile gases and a carbonaceous residue.

One method used to shape or spin polytetrafluoroethylene and related polymers is to spin the polymer from a mixture of an aqueous dispersion of fluoropolymer particles and viscose, where cellulose xanthate is the soluble form of the matrix polymer, as is taught in U.S. Pat. Nos. 3,655,853; 3,114,672; and 2,772,444. However, the use of viscose in fiber forming suffers from serious disadvantages related to cost of manufacture, production time and environmental hazards. Alternatives to viscose forming have been developed and most recently a process using cellulosic ethers with a uniform degree of substitution of the matrix has been fully described in U.S. Pat. Nos. 5,762,846 and 5,820,984.

Despite recent improvements, the prior art processes are still plagued by spinning compositions with insufficient shear stability. Because of the formation of PTFE agglomerates during mixing and pumping of the spinning composition, known processes employ filters at the spin pack to prevent pluggage of the spinners. With known processes the volume of agglomerates is significant, requiring frequent filter changes with the attendant material waste and low fiber production rates and yields caused by filter changes. In addition, processes using known spinning compositions are subject to an unacceptable number of fiber breaks during sintering at desirable spinning speeds.

It would be desirable to provide a spinning composition and a process for producing high tenacity fluoropolymer fibers in which the spinning compositions have the ability to withstand high levels of shear during processing, thereby reducing levels of agglomerates. It would also be desirable to provide a spinning composition and a process for producing high tenacity fluoropolymer fibers which decrease the number of fiber breaks during sintering.

SUMMARY OF THE INVENTION

The present invention relates to a process for dispersion spinning non-melt-processible fluoropolymer fiber in which a mixture of an aqueous dispersion of non-melt-processible fluoropolymer particles and an aqueous solution of a matrix polymer is formed. The non-melt-processible fluoropolymer particles have an SSG of less than about 2.40 and comprise a core of high molecular weight polytetrafluoroethylene and a shell of lower molecular weight polytetrafluoroethylene or modified polytetrafluoroethylene. The mixture is extruded into a coagulation bath containing a concentration of ions which coagulate the matrix polymer to form an intermediate fiber structure. The intermediate fiber structure is sintered to decompose the matrix polymer and coalesce the non-melt-processible fluoropolymer particles to form the fiber.

The present invention also provides a spinning composition useful for the dispersion spinning of non-melt-processible fluoropolymer fiber. The composition comprises a mixture of an aqueous dispersion of non-melt-processible fluoropolymer particles having an SSG of less than about 2.40, the fluoropolymer particles having a core of high molecular weight polytetrafluoroethylene and a shell of lower molecular weight polytetrafluoroethylene or modified polytetrafluoroethylene, and an aqueous solution of a matrix polymer.

DETAILED DESCRIPTION

Fluoropolymers

The fluoropolymer particles used in this invention comprise a core of high molecular weight polytetrafluoroethylene (PTFE) and a shell of lower molecular weight polytetrafluoroethylene or modified polytetrafluoroethylene.

Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modifying comonomer can be, for example, hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), perfluorobutyl ethylene (PFBE), or other monomer that introduces side groups into the molecule.

The fluoropolymer particles have a standard specific gravity (SSG) of less than 2.40, typically from about 2.14 to about 2.40, preferably less than about 2.30, and more preferably less than about 2.25. The SSG is generally inversely proportional to the molecular weight of PTFE or modified PTFE. SSG alone, however, cannot specify molecular weight as it is also dependent on the presence of modifier, the amount of modifier, and/or initiation by hydrocarbon initiators such as DSP. Also no agreement exists as to the correct mathematical form the relationship takes. The first representation of that relationship is expressed in a paper presented by Doban et al. at an ACS meeting Sep. 18, 1956 which gives the number average molecular weight to be with graphical data given in $$\overline{M}_n = 0.597[\log_{10}(0.157/(2.306-SSG))]^{-1}$$

Sperati & Starkwather, Fortschr. Hochpolym-Forsch. Bd. 2,S.465-495 (1961). Another expression of this relationship is stated by Noda et al. in U.S. Pat. No. 5,324,785 as:

$$Log_{10}M_n = 31.83 - 11.58 \times SSG$$

in which $M_n$ is average molecular weight. These equations result in different molecular weights for the same SSG values.

Molecular weight can be more consistently related to melt creep viscosity (MCV) values for PTFE polymers and melt creep viscosity is used in the present application to describe the molecular weight of the polymer. Molecular weight is linearly related to melt viscosity in Pa·s to the 1/3.4 power as stated in the following:

Melt creep viscosities for the fluoropolymer in accordance with the invention are preferably greater than about $4 \times 10^9$ Pa·s. Melt creep viscosity in this application is measured by the procedure U.S. Pat. No. 3,819,594 with certain modifications discussed below.

The fluoropolymer dispersion used in this invention is made by dispersion polymerization (also known as emulsion polymerization). In the manufacture of dispersions in accordance with the invention, the polymerization is carried out to form a particle structure in which molecular weight, and in some embodiments, composition vary from one stage of polymerization to another. The variation can be can be envisioned so as to view the particle as having discrete layers. While the properties of the "core" and "shell" cannot be measured independently by analytical methods, these concepts are equated with polymer formed, respectively, in first and later stages in the polymerization. The process produces PTFE of high molecular weight at the core of the particle and PTFE or modified PTFE of lower molecular weight near and/or at the surface of the dispersion particles. As explained more fully in U.S. Patent Publication 2003/0008944A1, the distinction made herein between core and shell relates to the amount of initiator present during the first (core) stage part of polymerization and during the later (shell) stage of polymerization as well as the presence or absence of telogenic agent and comonomer being introduced.

Particularly because of the core shell nature of the fluoropolymers used in this invention, the melt creep viscosity measured at the end of the batch is a weighted average of melt creep viscosities of the PTFE formed during the batch. For a growing particle, each incremental volume with its molecular weight contributes to the average. If, for instance, the molecular weight is increasing during the batch, each incremental volume has a higher molecular weight than the last incremental volume and the average molecular weight is always lower than that of the last volume increment. The molecular weight of a volume increment is termed the instantaneous molecular weight and the number average molecular weight is given by the expression $$\overline{M_n} = \frac{\lim_{n \to \infty} \sum_{i=1}^{n} M_{ni} \Delta V}{\lim_{n \to \infty} \sum_{i=1}^{n} \Delta V}$$

where $M_{ni}$ is the instantaneous molecular weight and $\Delta V$ is a volume or weight increment. The instantaneous molecular weight for each volume increment is a value selected such that a numerically integrated solution of the above expression yields the experimentally determined average molecular weight at any point during the batch.

For the purposes of the fluoropolymers used in the present invention, the average molecular weight $M_n$ of the shell is determined by the numerical integration, using at least 5 volume or weight increments beginning with and including the increment in which the $M_{ni}$ is the highest and concluding with the end of the batch. The $M_n$ for the core is determined similarly using at least 30 volume or weight increments beginning with the start of polymerization and ending with and including the increment in which the $M_{ni}$ is the highest. Average melt creep viscosity is then determined using the formula stated above for the relationship of melt creep viscosity to $M_n$.

In accordance with the preferred polymer for use in the practice of this invention, the core of the particles comprises high molecular weight polytetrafluoroethylene preferably having an average melt creep viscosity greater than about $4 \times 10^9$ Pa·s. The shell comprises lower molecular weight polytetrafluoroethylene or modified polytetrafluoroethylene preferably with an average melt creep viscosity greater than about $3 \times 10^9$ Pa·s and less than the average melt creep viscosity of polytetrafluoroethylene of the core. Preferably, the average melt creep viscosity of the polytetrafluoroethylene or modified polytetrafluoroethylene of the shell is at least $0.1 \times 10^{10}$ Pa·s, more preferably at least $0.2 \times 10^{10}$ Pa·s, less than the average melt creep viscosity of polytetrafluoroethylene of the core. Most preferably, the shell of lower molecular weight polytetrafluoroethylene or modified polytetrafluoroethylene has an average melt creep viscosity of about $3 \times 10^9$ Pa·s to about $1.3 \times 10^{10}$ Pa·s.

In fluoropolymers used in this invention, the shell comprises about 5 to about 30% by weight of the particles. Preferably, the shell comprises about 5 to about 25% by weight of the particles, most preferably, about 5 to about 20% by weight of the particles. Fluoropolymers used in this invention have the general character of known polymers made by dispersion polymerization processes. The resins used in this invention isolated and dried are non-melt-processible. By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

For preparation of a preferred fluoropolymer in accordance with the invention, a batch polymerization process is provided for producing a non-melt-processible dispersion. The polymerization process preferably involves the steps of precharging deionized water to a stirred autoclave and precharging saturated hydrocarbon having more than 12 carbon atoms which is liquid under polymerization conditions (preferably paraffin wax) and a dispersing agent (fluorinated surfactant), preferably a perfluorinated carboxylic acid having 6 to 10 carbon atoms. The hydrocarbon acts as a stabilizer in the polymerization process, preventing or retarding the formation of coagulated polymer in the agitated system. The process further involves deoxygenating, pressurizing the autoclave with TFE to predetermined level, agitating, and bringing the system to desired temperature, e.g., 60°-100° C.

To form the core, the polymerization is carried out in a first stage during which a first amount of free radical initiator, and additional dispersing agent (fluorinated surfactant) are added to the autoclave. During the first stage of the polymerization, the addition of agents providing telogenic activity is preferably minimized and most preferably the first stage is carried out without adding telogenic agents. The polymerization proceeds and additional TFE is added to maintain pressure. Then, during the second stage of the reaction, a second amount of free radical initiator is added with a telogenic agent and, for modified PTFE, a comonomer. The second amount of initiator produces lower molecular weight polytetrafluoroethylene or modified polytetrafluoroethylene preferably with an average melt creep viscosity of the polytetrafluoroethylene or modified polytetrafluoroethylene of the shell greater than about $3 \times 10^9$ Pa·s and less than the average melt creep viscosity of the polytetrafluoroethylene of the core. Preferably, the average melt creep viscosity of the polytetrafluoroethylene or modified polytetrafluoroethylene of the shell is at least $0.1 \times 10^{10}$ Pa·s less, more preferably at least $0.2 \times 10^{10}$ Pa·s less than the average melt creep viscosity of polytetrafluoroethylene of the core. Most preferably, the polymer produced for the shell of lower molecular weight polytetrafluoroethylene or modified polytetrafluoroethylene has an average melt creep viscosity of about $3 \times 10^9$ Pa·s to about $1.3 \times 10^{10}$ Pa·s.

When the desired amount of TFE is consumed, the feeds are stopped, the reactor is vented, and the raw dispersion is discharged from the polymerization vessel. The supernatant paraffin wax is removed. The dispersion is stabilized and/or concentrated.

The dispersing agent used in this process is preferably a fluorinated surfactant. Preferably, the dispersing agent is a perfluorinated carboxylic acid having 6-10 carbon atoms and is typically used in salt form. Suitable dispersing agents are ammonium perfluorocarboxylates, e.g., ammonium perfluorocaprylate or ammonium perfluorooctanoate.

The initiators preferably used in the process of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators preferred for this invention, small amounts of short chain dicarboxylic acids such as succinic acid or initiators that produce succinic acid such as disuccinic acid peroxide (DSP) may be also be added in order to reduce coagulum.

To produce the high molecular weight PTFE core, preferably no telogenic agent is added in the first stage of the reaction. In addition, quantities of agents with telogenic activity are minimized. In contrast, in the second stage of the reaction, such agents in addition to more initiator are added to reduce the molecular weight of that reached in the core. For the purposes of this patent application, the term telogenic agent broadly refers to any agent that will prematurely stop chain growth and includes what is commonly known as chain transfer agents. The telogenic agents used in this invention to produce the low molecular weight shell are typically non-polar and may include hydrogen or an aliphatic hydrocarbon or halocarbon or alcohol having 1 to 20 carbon atoms, usually 1 to 8 carbon atoms, e.g., alkanes such as ethane, or chloroform or methanol. Also effective are mercaptans such as dodecylmercaptan.

In producing a shell of modified PTFE, in addition to telogenic agent, comonomer is added in the second stage of the reaction. As stated above typical comonomers include hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), and perfluorobutyl ethylene (PFBE).

When dispersion is desired, a nonionic concentrating surfactant is added to raw dispersion and the polymer is held at a temperature above the cloud point of the nonionic surfactant. Once concentrated to about 30 to about 70 weight % fluoropolymer, and preferably about 45 to about 65 weight % fluoropolymer, the upper clear supernate is removed. Further adjustment of the final solids concentration and surfactant are made as needed. One patent illustrative of concentrating is U.S. Pat. No. 3,037,953 to Marks and Whipple. If concentration is not desired, surfactant may be added directly to the as-polymerized dispersion with heat to effect solution. In a preferred embodiment the aqueous dispersion of non-melt-processible fluoropolymer particles used in this invention comprises about 3 to about 11 weight % of a surfactant based on the weight of the fluoropolymer.

Nonionic surfactants commonly used in dispersion processing are Triton® X-100 and Triton® X-45, supplied by Dow Chemical. These surfactants are a form of octyl phenol ethoxylate. However, in order to achieve an environmentally clean manufacturing process while still maintaining shear stability, another suitable surfactant for use in this invention comprises an alcohol ethoxylate or mixture of alcohol ethoxylates of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18. For example, the ethoxylate of this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate of this invention does not contain an aromatic group. The number of ethylene oxide units in the hydrophilic portion of the molecule may comprise either a broad or narrow monomodal distribution as typically supplied or a broader or bimodal distribution which may be obtained by blending.

The aqueous dispersions of non-melt-processible fluoropolymer particles used in this invention have high molecular weight and a high shear stability. The resistance of a dispersion to agglomeration can be measured by a parameter known as gel time and is an indication of the shear stability of the dispersion. Preferably, the concentrated aqueous dispersion for fluoropolymers used in this invention having a core of high molecular weight polytetrafluoroethylene and a shell of lower molecular weight polytetrafluoroethylene or modified polytetrafluoroethylene wherein the molecular weight of the shell is sufficiently low that the aqueous polymer dispersion with about 45 weight % fluoropolymer and about 6 weight % surfactant has a gel time of greater than about 400 seconds, greater than about 450 seconds, and most preferably greater than 500 seconds.

The high gel time is an indication of a more homogeneous spinning mixture with reduced agglomerate formation and increased shear resistance. The high shear stability of the fluoropolymer dispersion enables the spinning composition to withstand the harsh processing conditions of dispersion spinning which involves stress supplied by mixers, gear pumps, and spinneret openings. It is believed that the low molecular weight polymer shell permits fluoropolymer particles to coalesce faster quickening the transition of intermediate fiber to fully coalesced fiber during the sintering process. Because of the high molecular weight core of the preferred PTFE polymers used in this invention, the sintered fiber product has increased tensile strength.

Spinning Composition and Matrix Polymers

The present invention provides a spinning composition useful for the dispersion spinning of non-melt-processible fluoropolymer fiber comprising a mixture of an aqueous dispersion of non-melt-processible fluoropolymer particles having an SSG of less than about 2.40, typically from about 2.14 to about 2.40, the fluoropolymer particles comprising a core of high molecular weight polytetrafluoroethylene and a shell of lower molecular weight polytetrafluoroethylene or modified polytetrafluoroethylene, and an aqueous solution of a matrix polymer. In preferred embodiments the non-melt-processible fluoropolymer particles have an SSG of less than 2.30, and more preferably less than about 2.25.

In another preferred embodiment the spinning composition contains core/shell fluoropolymer particles wherein the molecular weight of the polytetrafluoroethylene or modified polytetrafluoroethylene in the shell of the non-melt-processible fluoropolymer particles is sufficiently low that an aqueous dispersion at about 45 weight % fluoropolymer and at about 6 weight % surfactant has a gel time greater than about 400 seconds, preferably greater than about 450, and more preferably greater than about 500.

Matrix polymers used in the practice of the present invention may be polymers containing only hydrogen, carbon, oxygen and nitrogen that are soluble in aqueous solutions that may be coagulated or precipitated by a salt or a shift of pH. Cellulosic ether polymers are preferred since these polymers do not melt or soften below the temperature range in which most fluorinated olefinic polymers melt and the polymer decomposes into carbonaceous material on sintering. For example, such cellulosic polymers are methylcellulose, hydroxyethylcellulose, methylhydroxypropylcellulose, hydroxypropylmethylcellulose, hydroxypropylcellulose, ethylcellulose and carboxymethylcellulose. The cellulosic ethers preferred for use in this invention as a matrix polymer have a uniform degree of substitution, and are soluble in strong aqueous alkali hydroxide, but insoluble in near neutral pH water. By the term near neutral pH water is meant water having a pH from about 6 to 8. In addition, the matrix polymers used in the practice of the present invention have no softening or melting point. These polymers decompose at temperatures near the sintering temperature of the fiber providing requisite tensile strength until the fluoropolymer particles have coalesced such that the resultant fluoropolymer structure provides the necessary tensile strength.

The structural features that are strongly related to solubility of the cellulosic ethers are the functionality of chemical substituents in the cellulose ethers and the degree of substitution. By degree of substitution (DS) is meant the extent to which the hydroxyl groups of a cellulose molecule have been replaced with ether functional groups.

In a cellulose molecule, there are three hydroxyl groups on each anhydroglucoside ring. If all three of these hydroxyl groups have been replaced, the DS is 3, the maximum degree of substitution.

In order to achieve useful coalesced fluoropolymer fibers, it is desirable to wash the intermediate fiber structure free of ions absorbed from the coagulation bath as well as to remove other impurities such as additives and/or dispersants that are present in the initial fluoropolymer dispersion and to remove materials that are detrimental to fiber sintering and/or the properties of the final, coalesced fluorinated polymer fiber.

As used herein, intermediate fiber structure means the extruded and coagulated mixture of the matrix polymer solution and the polymer particle dispersion. The intermediate fiber structure of the present invention has a self supporting length of at least 30 cm after being washed substantially free of ions and impurities. The intermediate fiber structure of the present invention, after washing in near neutral pH water to substantially remove ions and impurities, shows no substantial loss of strength or integrity, and may be worked, for example drawn at a modest draw ratio, and sintered to form a final, coalesced fluorinated polymer fiber or shaped article. The intermediate fiber structure of the present invention may be isolated, worked in subsequent processing or used for producing fabrics or batts as is known in this art. The strength of the intermediate fiber structure an be determined by the procedure described in U.S. Pat. Nos. 5,762,846 and 5,820,984.

As will be understood by one skilled in this art, fiber structure includes, as well as typical fiber monofilament and fiber bundle structures, elongated tapes, ribbons, films and the like.

In the present invention the composition of the intermediate fiber structure has a cellulosic ether present as a minor constituent of the fiber solids, while the major constituent is non-melt processible fluoropolymer particles having a weight in the intermediate fiber structure that may be from 3 to 20 times that of the matrix polymer.

In order for the intermediate fiber to be water washable, the matrix polymer must have precisely defined properties of insolubility in water which is near neutral in pH and at process temperatures. In addition, it is preferred that the matrix polymer neither soften or melt at a temperature substantially below that of sintering, otherwise the intermediate fiber structure may stretch, weaken or break under its own weight as it is heated to sintering temperatures.

Nonionic cellulosic ethers, such as hydroxypropylcellulose and hydroxyethylcellulose, provide particularly good spinning compositions for dispersion spinning of fluorinated polymers. DS values that are representative of the matrix polymers of the present invention are values that range from about 0.02 to 0.5. Uniformity of substitution for the matrix polymers of the present invention is preferable, and is indicated by transparency of the solution formed in about 10% by weight aqueous sodium hydroxide or the substantial absence of insoluble matrix polymer which would collect on a 1 micron pore size filter suitable for the filtration of diluted matrix polymer solutions of aqueous sodium hydroxide.

The matrix solution of any of the matrix polymers of the present invention or mixtures thereof, may be prepared by dissolving the particular cellulosic ether in a solution of about 5 to 10% by weight sodium hydroxide.

For hydroxypropylcellulose matrix polymer, a material characterized by having a viscosity of at least 90 mPa·sec when dissolved at 2% by weight in 10% sodium hydroxide solution and measured at 25° C. is preferred, although solutions of lower viscosity material may be successfully spun.

The spinning compositions used in the process of the present invention are made by mixing an aqueous dispersion of fluorinated polymer particles with a solution of the matrix polymer of the present invention. Aqueous dispersions of non-melt processible fluoropolymer particles, such as those described above are used in the present process. The solutions of matrix polymer should be clear and of a viscosity that assures good mixing with the dispersion. Preferably the concentration of matrix polymer in the solution is from 3 to 10% by weight. These components are then mixed such that the ratio of the weight of the polymer particles to that of the matrix polymer in the intermediate fiber structure is from about 3 to 1 to about 20 to 1, and preferably about 9 to 1.

The spinning composition provided by the invention has reduced levels of agglomerates which give rise to fiber breaks in spinning, washing and initial drawing and reduce the frequency for time-consuming and costly filter changes. The homogeneous spinning composition is faster to sinter, reducing the frequency of fiber breaks during hot drawing. In a preferred embodiment of the invention, the high molecular weight core aids in the production of high tenacity fiber while the low molecular weight shell enhances the shear resistance of the spinning composition and improves fiber coalescence during sintering.

Process

The present invention provides a process for dispersion spinning non-melt-processable fluoropolymer fiber comprising the steps of:

(a) forming a mixture of an aqueous dispersion of non-melt-processable fluoropolymer particles having an SSG of less than about 2.40, the fluoropolymer particles comprising a core of high molecular weight polytetrafluoroethylene and a shell of lower molecular weight polytetrafluoroethylene or modified polytetrafluoroethylene, with an aqueous solution of a matrix polymer;

(b) extruding the mixture into a coagulation bath containing a concentration of ions which coagulate the matrix polymer to form an intermediate fiber structure; and (c) sintering the intermediate fiber structure to decompose the matrix polymer and coalesce the non-melt-processable fluoropolymer particles to form the fiber.

By the term dispersion spinning is meant the process by which a dispersion of insoluble polymer particles is mixed with a solution of a soluble matrix polymer, and this mixture is coagulated by contacting the mixture with a coagulation solution in which the matrix polymer becomes insoluble.

Dispersion spinning of fibers articles, is useful for producing shaped fibers from non-melt-processable fluoropolymers. These polymers, which are difficult to form by melt extrusion or solution spinning, may be successfully spun from a mixture of an aqueous dispersion of fluorinated polymer particles mixed with a solution of a suitable matrix polymer. An intermediate structure is formed when this mixture is contacted with a suitable coagulation bath. Although the intermediate structure is mechanically sound, a final, sintered structure is generally formed by heating the intermediate structure to a temperature sufficient to coalesce the fluorinated polymer particles. On sintering the matrix polymer decomposes to form volatile gases and a carbonaceous residue.

It is preferred to form the fibers in accordance with present invention by extruding the mixture of the matrix polymer solution and the fluorinated particle dispersion into a coagulation liquid which rapidly gels the article. The formed article may then be washed and further processed. The composition of coagulation liquids depends, to some extent, on the particular matrix polymer being used. Useful coagulation liquids include a large variety of aqueous solutions typified but not limited to 40% ammonium acetate—5% acetic acid, 30% acetic acid, or 30% calcium chloride. Of particular value for the cellulose ethers used in this invention is a 5% sulfuric acid—18% sodium sulfate solution. The temperature of the coagulation bath can be adjusted to that which provides the best properties for the intermediate fiber structure, and is typically in the range of 20° C. to 90° C.

The intermediate fiber produced in the present invention is preferably washed substantially free of ions and impurities with no substantial loss of strength. By the term substantially free of ions and impurities is meant that the pH and conductivity of deionized wash water is unchanged after dipping the intermediate fiber into the water. The self supporting length of the washed intermediate fiber is at least 30 cm.

The fiber is passed over initial tensioning rolls, passed by stationary bars or combs to partially de-water the fiber and then passed through hot drawing rolls to decompose the matrix polymer and sinter the fluoropolymer. Further drawing, and bleaching steps may be employed for the manufacture of continuous fiber or a step of chopping the fiber into short lengths may be employed to produce a PTFE floc useful as a polymer additive.

Test Methods

Raw Dispersion Properties:

Solids content of PTFE raw (as polymerized) dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.)

Raw dispersion Particle size (RDPS) is measured by photon correlation spectroscopy.

Surfactant Content:

The surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is usually stated in weight % based on PTFE solids.

Resin Properties:

Standard specific gravity (SSG) of PTFE fine powder resin is measured by the method of ASTM D-4895. If a surfactant is present, it can be removed by the extraction procedure in ASTM-D-4441 prior to determining SSG by ASTM D-4895.

Melt creep viscosity (MCV) is measured at 380° C. by a modification of the tensile creep method disclosed in U.S. Pat. No. 3,819,594, with the mold at room temperature, using a molding pressure of 200 kg/cm$^2$ (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation.

Copolymer Composition:

Comonomer content of the modified PTFE resins is determined by Fourier transform infrared spectroscopy using the method disclosed in U.S. Pat. No. 4,837,267. For PPVE-modified PTFE, a multiplicative factor of 0.97 derived from the calibration curve is used to convert the ratio of the absorbance at 995 cm$^{-1}$ to that at 2365 cm$^{-1}$ to PPVE content in weight %.

Shear Stability:

The shear stability of dispersions used in this invention is determined by a gel time test. Non-ionic surfactant is added to the as-polymerized dispersion. The % solids and % surfactant are adjusted to approximately 45% solids and 6.0% surfactant based on the weight of the PTFE solids. The non-ionic surfactant used in the examples is either Triton® X-100 or Triton® X-45, supplied by Dow Chemical, unless otherwise specified. The dispersion is heated to approximately 40° C. and stirred to disperse the surfactant. 200 ml of dispersion is placed in a Waring commercial explosion resistant blender (Model 707SB, one quart size, 2 speed, air requirements—10 scfm@10 psi, available from Waring of New Hartford, Conn.) and stirred at the highest speed until the dispersion gels. The gel time is recorded in seconds. The test is terminated after 15 minutes if the dispersion does not gel. Between gel time tests the blender is disassembled and thoroughly cleaned.

EXAMPLES

Unless otherwise specified, solution concentrations are stated in weight % based on combined weights of solute and solvent water.

Comparative Example A

This Comparative Example illustrates the polymerization of TFE to make a PTFE homopolymer aqueous dispersion that is not core/shell, suitable for fiber spinning when mixed with HPC solution as taught in U.S. Pat. Nos. 5,762,846 and 5,820,984. A polykettle having a horizontal agitator and a water capacity of 37.85 Kg is charged with 18.2 Liters of demineralized water, 900 g of a paraffin wax supplied by Exxon and 0.5 g Triton® X-45. The contents of the polykettle are heated to 65° C., and the polykettle is evacuated and purged with TFE. Into the evacuated polykettle are charged, 25.5 g ammonium perfluorooctanoate, 5 g methanol, and 8 g of DSP in 2.1 L of demineralized water. The contents of the polykettle are agitated at 50 rpm. The temperature is increased to 90° C. TFE is then added until the pressure is 2.72 MPa. Then 0.6 g APS in 250 ml of demineralized water in are added at a rate of 40 ml/min. Once the pressure has declined by 0.1 MPa the batch is considered to have kicked off. TFE is added at a rate sufficient to maintain the pressure at 2.72 MPa. Once 1.36 Kg of TFE have reacted from the kick off time, 22.7 g C-8 and 11.7 g DSP in 1 Liter are added at a rate of 25 ml/min. TFE is added at a rate sufficient to maintain the pressure at 2.72 MPa. After 15 Kg of TFE have been feed the TFE feed is stopped and the polykettle pressure is allowed to decrease to 1.25 MPa. Once that pressure has been reached the agitator is turned off and the batch vented. The length of the reaction, measured from kickoff to the cessation of agitation, is 75 min. The contents are discharged from the polykettle and the supernatant wax is removed. Solids content of the raw dispersion is 46.5 weight % and RDPS is 129 nm. Part of the dispersion is frozen and the PTFE is filtered out of the thawed mixture. The contents are discharged from the polykettle and the supernatant wax is removed. The PTFE is dried at 150° C. for three days. The resultant PTFE resin has a SSG of 2.23 To part of the dispersion Triton® X-100 is added to give a concentration of 6 weight % based on PTFE solids and the gel time is found to be 180 seconds.

The gel time of this PTFE homopolymer aqueous dispersion is low compared to the core/shell polymers used in the Examples of this invention. Reduced shear stability is indicated by the low gel time.

Example 1

This Example illustrates the polymerization of TFE to make a PTFE core/shell aqueous dispersion suitable for fiber spinning when mixed with HPC solution with improved shear stability and higher fiber tenacity than the fluoropolymer dispersion of the prior art as exemplified in Example A. A polykettle having a horizontal agitator and a water capacity of 37.85 Kg is charged with 18.2 Kg of demineralized water and 900 g of a paraffin wax supplied by Exxon and 0.5 g of Triton® X-45. The contents of the polykettle are heated to 65° C., and the polykettle is evacuated and purged with TFE. Into the evacuated polykettle are charged, 0.5 Kg of a 5.4 wt % solution of ammonium perfluorooctanoate and 0.5 ml of Triton® X-45 emulsified therein. The contents of the polykettle are agitated at 50 rpm. The temperature is increased to 90° C. TFE is then added until the pressure is 2.72 MPa. Then, 200 ml of a fresh initiator solution of 8 g of disuccinyl peroxide and 0.4 g of ammonium persulfate (APS) in 200 ml of water are added at the rate of 20 ml/min. Once the pressure has declined by 0.1 MPa the batch is considered to have kicked off. TFE is added at a rate sufficient to maintain the pressure at 2.72 MPa. Once 1.36 Kg of TFE have reacted from the kick off time, 1 L of a 3 weight % C-8 solution containing 11.6 g DSP is added at the rate of 50 ml/min. TFE is added at a rate sufficient to maintain the pressure at 2.72 MPa. After 13.6 Kg of TFE have been added following initial pressurizing with TFE, an additional 200 ml of a solution of 5 g of APS and 60 ml of methanol per liter are added at the rate of 100 ml/min. The polymerization time from kickoff to the second initiator addition is 78 min. After 15 Kg of TFE have been added, the TFE feed is stopped and the polykettle pressure is allowed to decrease to 1.31 MPa. Once that pressure has been reached the agitator is turned off and the batch vented. The length of the reaction, measured from kickoff to the cessation of agitation, is 78 min. The contents are discharged from the polykettle and the supernatant wax is removed. Solids content of the raw dispersion is 46.8 weight % and RDPS is 190 nm.

Examples 2-5

Examples 2 through 5 illustrate the polymerization of TFE to make a PTFE core/shell resin suitable for fiber spinning when mixed with HPC solution having with improved shear stability and higher fiber tenacity. These fluoropolymers are made in the same polykettle and using the same procedures as in Example 1 except with changes to the type and amount of the Triton surfactant, amount of pumped DSP and amounts of the shell initiator as shown in Table 1.

TABLE 1

|  | Example | | | | |
| --- | --- | --- | --- | --- | --- |
|  | 1 | 2 | 3 | 4 | 5 |
| Triton X-45, g | 0.5 | 0.25 | 0.5 | — | — |
| Triton X-100, g | — | — | — | 0.008 | 0.008 |
| APS Pre-charge, g | 0.4 | 0.4 | 0.4 | 0.03 | 0.03 |
| DSP Pre-charge, g | 8 | 8 | 8 | 12 | 12 |
| DSP Pumped, g | 11.6 | 11.6 | 11.6 | 0 | 0 |
| Initiator Shell, ml | 200 | 200 | 500 | 200 | 500 |
| Solids, wt. % | 46.8 | 46.3 | 45.4 | 46.2 | 45.8 |
| RDPS, nm | 190 | 197 | 191 | 254 | 261 |
| SSG | 2.2442 | 2.2415 | 2.2413 | 2.2059 | 2.2128 |
| Gel Time, sec | 427 | 632 | >900 | >900 | >900 |

Example 6

A solution is prepared by slurrying 1.9 kg of hydroxypropylcellulose (HPC) in 15.8 liters of soft water at about 25° C. After the HPC is wetted out, 12.3 kg of 23% sodium hydroxide solution is added to the water/HPC mixture. The resulting mixture is stirred under vacuum (about 29 mm Hg) for 1 hour and then is filtered through 50 μm polypropylene felt bag filter into a thin film deaerator operating at about 29 mm Hg vacuum. The resulting solution had a viscosity of 4,800 mP·sec at 25° C. A stream of the above solution merged with a stream of aqueous non-melt-processible resin as prepared in Example 4 at relative rates such that the ratio of PTFE solids to HPC solids by weight is 8.2 and mixed in an in-line static mixer. The resulting mixture is then pumped through a spinneret containing 180 holes (6 mil diameter) submerged under the surface of a coagulation bath. The coagulation bath composition is 5% sulfuric acid and 18% sodium sulfate. Its temperature is held at 55° +/−3° C. The resulting fibers are then passed through a wash bath of soft water held at 58° +/−5° C. and then onto a set of rotating hot rolls. The surface temperature of these rolls is held at 130° +/−5° C. to dry the fiber. The yarn is passed to another set of rotating hot rolls. The surface temperature of these rolls is held at 363° C.+/−5° C. to sinter the fiber. The yarn is passed to a set of unheated "draw rolls" on which multiple wraps are placed. The speed difference between the second set of hot rolls and the "draw rolls" is such that the yarn is drawn 6.62 times. This is known as the draw ratio. From the draw roll the yarn is wound on a paper tube.

Yarn processing proceeds well at higher rates with little waste and fewer yarn breaks as a result of the reduced agglomerates present in a spinning composition of core-shell PTFE polymer.

What is claimed is:

1. A spinning composition useful for the dispersion spinning of non-melt-processible fluoropolymer fiber comprising:
   a mixture of an aqueous dispersion of non-melt-processible fluoropolymer particles having an SSG of less than about 2.40, said fluoropolymer particles comprising a core of high molecular weight polytetrafluoroethylene and a shell of lower molecular weight polytetrafluoroethylene or modified polytetrafluoroethylene, and an aqueous solution of a matrix polymer.

2. The spinning composition of claim 1 wherein the SSG of said non-melt-processible fluoropolymer particles is from about 2.14 to about 2.40.

3. The spinning composition of claim 1 wherein the molecular weight of the polytetrafluoroethylene or modified polytetrafluoroethylene in the shell of said non-melt-processible fluoropolymer particles is sufficiently low that an aqueous dispersion at about 45 weight % fluoropolymer and at about 6 weight % surfactant has a gel time greater than about 400 seconds.

4. The spinning composition of claim 1 wherein the molecular weight of the polytetrafluoroethylene or modified polytetrafluoroethylene in the shell of said non-melt-processible fluoropolymer particles is sufficiently low that an aqueous dispersion at about 45 weight % fluoropolymer and at about 6 weight % surfactant has a gel time greater than about 450 seconds.

5. The spinning composition of claim 1 wherein said aqueous dispersion of non-melt-processible fluoropolymer particles comprises about 3 to about 11 weight % of a surfactant based on the weight of said fluoropolymer.

6. The spinning composition of claim 1 wherein said aqueous dispersion of non-melt-processible fluoropolymer particles comprises about 45 to about 65 weight % non-melt processible fluoropolymer.

7. The spinning composition of claim 1 wherein said melt-processible fluoropolymer particles in said aqueous dispersion have an average melt creep viscosity of the polytetrafluoroethylene of said core greater than about $4 \times 10^9$ Pa·s.

8. The spinning composition of claim 1 wherein said melt-processible fluoropolymer particles in said aqueous dispersion have an average melt creep viscosity of the polytetrafluoroethylene or modified polytetrafluoroethylene of said shell greater than about $3 \times 10^9$ Pa·s and less than the average melt creep viscosity of polytetrafluoroethylene of said core.

9. The spinning composition of claim 1 wherein said melt-processible fluoropolymer particles in said aqueous dispersion have an average melt creep viscosity of the polytetrafluoroethylene or modified polytetrafluoroethylene of said shell of about $3 \times 10^9$ Pa·s to about $1.3 \times 10^{10}$ Pa·s.

10. The spinning composition of claim 1 wherein said shell of said melt-processible fluoropolymer particles in said aqueous dispersion comprises about 5 to about 30% by weight of said fluoropolymer particles.

11. The spinning composition of claim 1 wherein the matrix polymer is a cellulosic ether polymer.

12. The spinning composition of claim 1 wherein the matrix polymer is selected from the group consisting of methylcellulose, hydroxyethylcellulose, methylhydroxypropylcellulose, hydroxypropylmethylcellulose, hydroxypropylcellulose, ethylcellulose and carboxymethylcellulose.

* * * * *